(12) United States Patent
Accomazzi (10) Patent No.: US 7,031,505 B2
(45) Date of Patent: Apr. 18, 2006

(54) PERSPECTIVE WITH SHEAR WARP

(75) Inventor: Vittorio Accomazzi, Toronto (CA)

(73) Assignee: Cedara Software Corp., Mississauga (CA)

( * ) Notice: Subject to any disclaimer, the term of this patent is extended or adjusted under 35 U.S.C. 154(b) by 16 days.

(21) Appl. No.: 10/792,126

(22) Filed: Mar. 4, 2004

(65) Prior Publication Data

US 2004/0170311 A1    Sep. 2, 2004

Related U.S. Application Data

(63) Continuation of application No. 10/122,148, filed on Apr. 15, 2002, now abandoned, which is a continuation of application No. PCT/CA00/01184, filed on Oct. 13, 2000.

(30) Foreign Application Priority Data

Oct. 15, 1999    (CA) .................................. 2286447

(51) Int. Cl.
*G06K 9/00* (2006.01)
(52) U.S. Cl. ............................ 382/131; 382/285; 378/4
(58) Field of Classification Search ........ 382/128–133, 382/154, 168, 191, 203, 209, 232, 255, 260, 382/274, 277, 284, 285, 299, 302, 305; 345/419, 345/427; 600/443, 407, 431; 378/4
See application file for complete search history.

(56) References Cited

U.S. PATENT DOCUMENTS

| | | | | |
|---|---|---|---|---|
| 5,787,889 A | * | 8/1998 | Edwards et al. ............ | 600/443 |
| 5,803,082 A | * | 9/1998 | Stapleton et al. ........... | 600/407 |
| 5,956,418 A | * | 9/1999 | Aiger et al. ................. | 382/154 |
| 6,002,738 A | * | 12/1999 | Cabral et al. ................. | 378/4 |
| 6,167,297 A | * | 12/2000 | Benaron ...................... | 600/431 |
| 6,330,356 B1 | * | 12/2001 | Sundareswaran et al. ... | 382/154 |
| 6,553,152 B1 | * | 4/2003 | Miller et al. ................ | 382/294 |

OTHER PUBLICATIONS

Lacroute, "Real-time volume rendering on shared memory multiprocessors using the shear-warp factorization", IEEE Parallel Rendering Symposium, pp. 15-22, Atlanta, GA, USA, Oct. 1995.

He and Haufman, "Fast Stereo Volume Rendering", IEEE Visualization: Proceedings of the 7th conference on Visualization '96, pp. 49-56, 466, San Francisco, California, USA, 1996.

(Continued)

*Primary Examiner*—Daniel Miriam
*Assistant Examiner*—Seyed Azarian (57) ABSTRACT

The present invention relates to a method for generating an 2-D projection directly from a 3-D volume data, the method comprising the steps of determining a viewing direction vector in a viewing frustum, determining a major axis of the direction vector, resampling the volume data in the direction of the major axis, applying a shear factorization to the resampled data; and rendering the factorized data. The method provides a singularly warped image which avoids have to patch images from multiple warp functions which, in turn, improves the quality of the final image. Finally, the image allows a scene to be rendered from within the scene itself. The invention can be applied to medical imaging and enable a surgeon to view an image such as a CT scan with perspective as well as from within the scan itself, providing the surgeon with an invaluable tool.

39 Claims, 8 Drawing Sheets

OTHER PUBLICATIONS

Lacroute, "Analysis of a Parallel Volume Rendering System Based on the Shear-Warp Factorization", IEEE Transactions on Visualization and Computer Graphics, vol. 2, No. 3, pp. 218-231, Sep. 1996.

Lacroute and Levoy, "Fast Volume Rendering Using a Shear-Warp Factorization of the Viewing Transformation", International Conference on Computer Graphics and Interactive Techniques: Proceedings of the 21st annual conference on Computer graphics and interactive techniques, pp. 451-458, Orlando, Florida, USA, Jul., 1994.

Lacroute, "Fast Volume Rendering Using a Shear-Warp Factorization of the Viewing Transformation", Ph.D. dissertation, Technical Report CSL-TR-95-678, Stanford University, chapter 3, pp. 29-43, 1995.

* cited by examiner

PERSPECTIVE WITH SHEAR WARP

This is a continuation of U.S. patent application Ser. No. 10/122,148 filed Apr. 15, 2002 now abandoned which is a continuation of PCT/CA00/01184 filed Oct. 13, 2000 which claims priority from Canadian Patent Application No. 2,286,447, filed Oct. 15, 1999.

The present invention relates to the field of three-dimensional (3-D) image rendering, and more particularly to fast volume rendering using shear warp factorization.

BACKGROUND OF THE INVENTION

Real-time rendering of 3-D images in volume visualization applications has become increasingly important. This is particularly useful in clinical applications for the display and analysis of volumetric data sets acquired by imaging methods such as Computed Tomography (CT), Magnetic Resonance Imaging (MRI) or Ultrasonic imaging. Benefits of volume visualization include the ability to obtain oblique views for the increased understanding of complex geometric structures within organs, and the ability to measure volumes, areas, and distances. Volume visualization also provides the ability to explore the spatial relationship between an organ and its surrounding structures or tissues. In general, generation of 3-D images includes the steps of data acquisition, volume reconstruction, and image visualization. Volume rendering is a technique that generates a two-dimensional (2-D) projection directly from the 3-D volume data without requiring any intermediate geometrical data structure.

Unfortunately, the application of volume rendering to medical imaging and scientific visualization is limited because it is computationally expensive to generate acceptable frame rates. In order for rendering to be effective it is important that it is interactive, that is a user can make certain requests of the image and expect a real-lime response. High quality images would take tens of seconds or even minutes to generate using typical workstation technology.

Various approaches have been tried in an attempt to improve the response time. One approach is to trade quality for speed. This approach is ineffective because many perceptual components of the image are obscured from the view of the user. A more costly approach is to rely on special-purpose hardware, which drastically reduces the flexibility of the system. Another approach relies on brute force and simply attempts to render an image by utilizing large multiprocessor computers to perform the rendering in parallel. These types of computers, however, are very expensive and require a large number of processors to achieve acceptable frame rates.

A further approach is to provide better, faster volume rendering algorithms. Several existing volume-rendering algorithms operate by sampling the 2-D slices of the 3-D volume data (also known as factorization), at a fixed resolution; shearing the sampled slices to form an intermediate but distorted image; and warping the intermediate image in 2D to form an undistorted final image. An example of such a technique is described in U.S. Pat. No. 5,787,889 titled "Ultrasound imaging with real-time 3d image reconstruction and visualization".

The image visualization process derives 2D image projections of the 3D image. The stack of 2D images is known as the "stack space". A shear warp factorization process is used to derive the new 2D projection for one or more video frames of the image. For each change in viewing angle, the processor factorizes the necessary viewing transformation matrix into a 3D shear, which is parallel to slices of the volume data. A projection of the shear forms a 2D intermediate image. A 2D warp is implemented to produce the final image, (that is, a 2D projection of the 3D volume at a desired viewing angle).

Figure 1A:
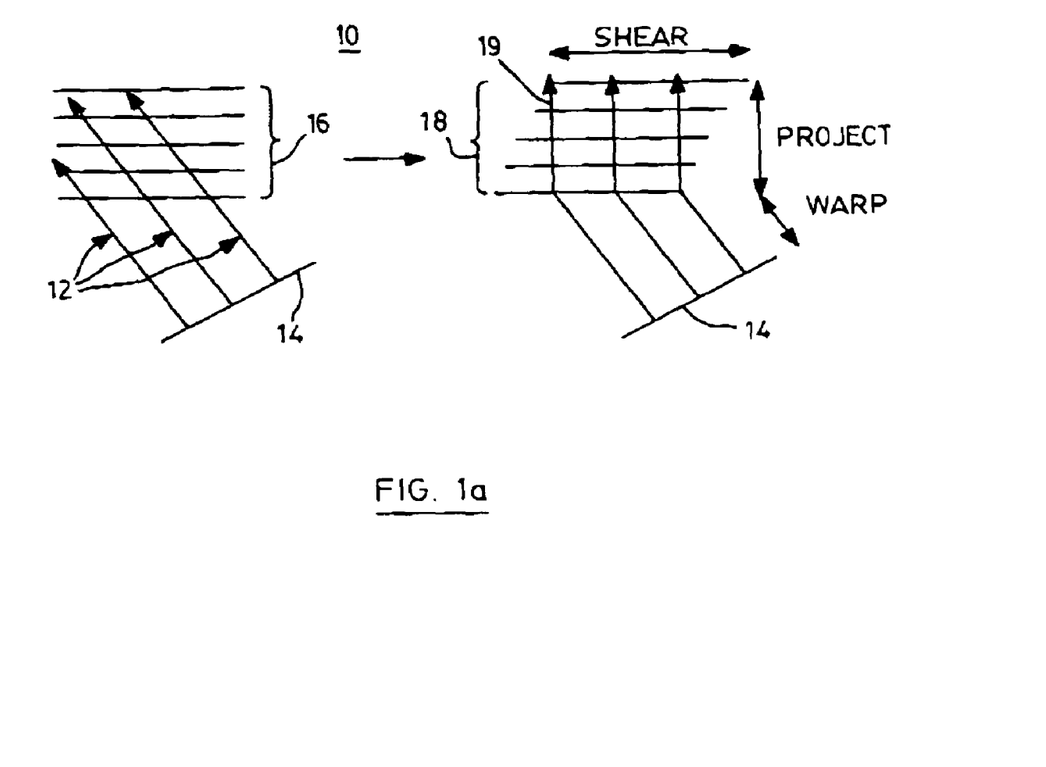
FIG. 1(a) is an illustration of shear warp factorization with parallel projection according to the prior art.

During the process of re-visualizing the volume at a different viewing angle, the reconstructed volume is sheared by transforming the reference coordinate system to an intermediate coordinate system. This simplifies mapping of the data. The intermediate coordinate system also is referred to as "sheared object space". The sheared object space is selected so that all viewing rays are parallel to one of the axes of the original coordinate system for the volume (e.g., the reference coordinate system). FIG. 1(a) depicts the transformation into sheared object space for parallel projection. The volume is retrieved as a set 16 of volume slices. The shearing direction for the volume is parallel to the set 16 of slices. Alternatively, the set of slices is resampled to be parallel to the shearing direction.

The slices 16 then are translated and resampled to achieve image projection rays 19 which are perpendicular to the sheared slices 18. The intermediate image projection plane is parallel to the slices of the volume. Since all the projection rays 19 are perpendicular to both the projection plane 14 and the slices 18, an imaging process for the projection causes the image data to be accessed in storage order. Because the shearing occurs only on two axes, a simple translation operation is used which does not use a lot of computation. The result of the shear factorization is a distorted image projection. Such distorted projection is not displayed. Before the volume is displayed, the projection undergoes a 2D geometric image warping operation to create a final 2D image projection of the volume.

Figure 1B:
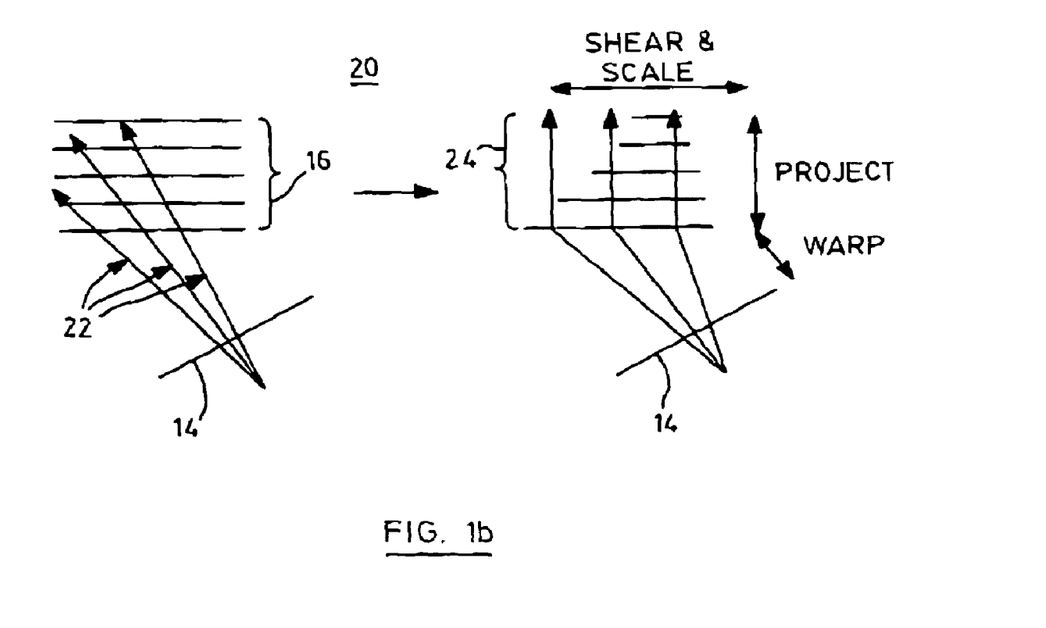
FIG. 1(b) is an illustration of shear warp factorization with perspective projection according to the prior art.

FIG. 1(b) illustrates perspective projection and is represented by the numeral 20. For a perspective transformation, the slices 16 are scaled in addition to being sheared to achieve sheared object space slices 24. The scaling produces an effect that allows an observer to perceive the volume with perspective. Such a method is best described in a paper titled "Fast Volume Rendering Using a Shear-Warp Factorization of the Viewing Transformation", Technical Report CSL-TR-95-678, Departments of Electrical Engineering and Computer Science, Stanford University, September 1995.

However, the current implementations of shear warp factorization are limited in several aspects. First of all, the major axis is not unique for all the rays in the viewing frustum. As previously mentioned, the major axis is used for factorization. Therefore, since there are three coordinate axes, there are three possible major axes, and a scene may be rendered in as many as three different factorizations. Each rendering process produces an image patch and joining, or stitching, the patches together create the final scene.

It has been found that the stitching process is computationally not trivial and furthermore, some distortion is created along the border of the patches. The distortion occurs since the factorizations are only mathematical models and, therefore, the results may differ slightly between factorizations. Additionally, using two or more factorizations is expensive in terms of memory access and computation.

Furthermore, current implementations also do not allow the observer to view the image from a position within the data set, a position, which can provide valuable information to the observer.

It is an object of the present invention to obviate or mitigate at least some of the above mentioned disadvantages.

SUMMARY OF THE INVENTION

An advantage of the present invention is a method for generating a 2-D image with perspective using shear-warp factorization that uses one copy of the volume data.

A further advantage of the invention is the volume data may be accessed in storage order and which has the further advantage of accessing memory once for every slice.

In accordance with this invention there is provided a method for generating an 2-D projection directly from an 3-D volume data, the method comprising the steps of:
(a) determining a viewing direction vector in a viewing frustum;
(b) determining a major axis of the direction vector;
(c) resampling the volume data in the direction of the major axis;
(d) applying a shear factorization to the resampled data; and
(e) rendering the factorized data.

In accordance with a further embodiment there is provided a system for generating a 2-D projection directly from a 3-D volume dam, they system including a microprocessor programmed in accordance with the method of this invention.

BRIEF DESCRIPTION OF THE DRAWINGS

These and other embodiments of the invention will now be described by way of example only, with reference to the accompanying drawings in which:

FIGS. 3(a) and (b) are schematic diagram showing the coordinate systems used in an embodiment of the present invention;

DESCRIPTION OF THE PREFERRED EMBODIMENT

Figure 2:
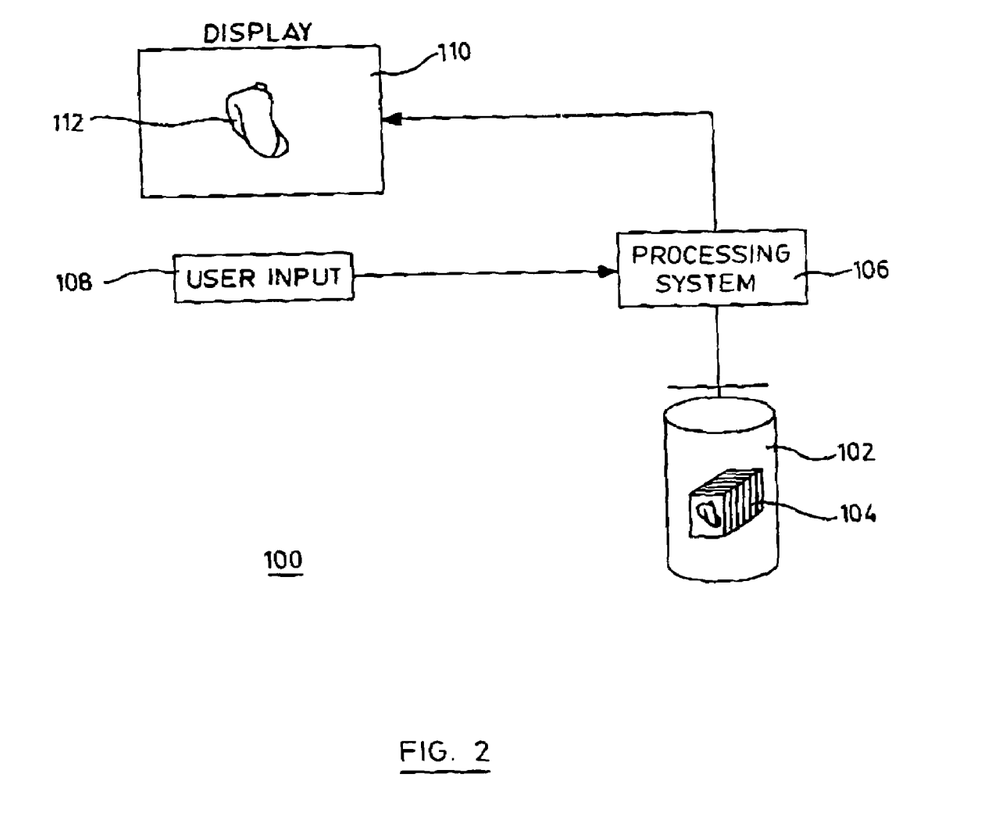
FIG. 2 is a schematic diagram of a volume rendering system for implementing an embodiment of the present invention.

In the following description, like numerals refer to like structures in the drawings. Referring to FIG. 2, a block diagram of an imaging system for implementing an embodiment of the present invention is shown generally by numeral 100. The system 100 includes a memory 102 for storing a dataset 104 comprising a slice stack of the volume data, a processing system 106 responsive to a user input 108 for rendering and displaying on a display 110 a view 112 of the dataset 104.

To reconstruct an image on the display in substantially realtime, in response to a user selected view of the dataset, the processing system performs a transformation by shear factorization To create a distorted image projection. Such distorted projection is not displayed. Before the volume is displayed, the projection undergoes a 2D geometric image warping operation to create a final 2D-image projection of the volume. Thus given a scene defined by a volume, a viewing position, a viewing direct ion and a viewing frustum, the method selects an axis to use in the factorization, by ensuring that it is the one with the biggest component in the viewing direction or major axis. This is achieved by resampling the volume slices with a finer grid along this major axis and then rendering the image as above.

Figure 3:
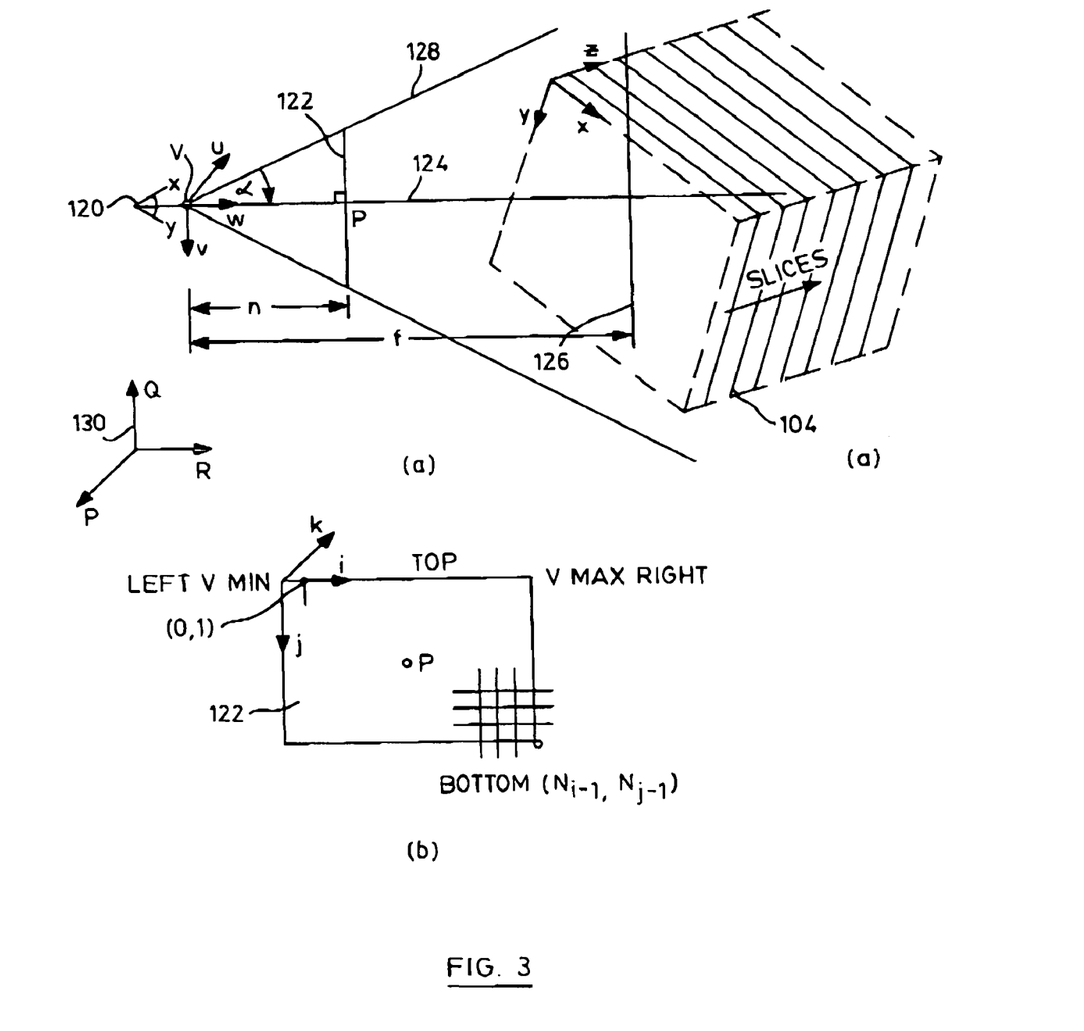

This may be illustrated geometrically by referring to FIGS. 3(a) and 3(b), which also shows the various coordinate systems used in an imaging system according to an embodiment of the invention. The relationship between the various coordinates systems is well known in the art, but is briefly described herein for convenience. The coordinate systems includes a viewer 120 at a viewpoint V with a coordinate system defined by orthogonal axes (u,v,w), an image plane P 122 at a distance n along a viewing direction 124 and a far plane 126 a distance f in the volume 104. The volume 104 is comprised of a series of slices (obtained through a CT scan, MRI, UlTtrasonic or other techniques). Another coordinate system having orthogonal axes (x,y,z) is defined with its origin at one corner of the volume 104, and the x-y plane parallel to the slices and extending in the z direction as shown in FIG. 3(a). A viewing frustum 128 is shown haying an angle α to the viewing direction 124. The entire system is referenced with respect to a world coordinate system 130.

Thus, data indicating the viewpoint in V in the 3D workspace includes coordinate data indicating the viewpoint's position. Data indicating the viewpoint in a 3D workspace may also include data indicating the viewpoint's "direction of orientation" in the workspace. The direction of orientation is the direction from the viewpoint into the field of view along the axis at the center of the field of view. Each viewpoint into a 3D workspace provides a view into the workspace that is delineated by a truncated pyramid structure called the viewing frustum as shown in FIG. 3(a). As may be seen specifying two items specifies the viewing frustum: the position of the user's eye and the position of a point in the workspace to be centered in the view. A viewing transform automatically procudes an axis defined by these two items, which is called the "line of sight." The "line of sight" is a ray cast from the user's eye through the center of the viewing frustum and produces an axis orthogonal to the image surface of the display.

As may be seen in FIG. 3(b), the image plane 122 is shown as comprised of rows and columns of pixels (or voxels) with the point P at the center of the image plane.

Figure 4A:
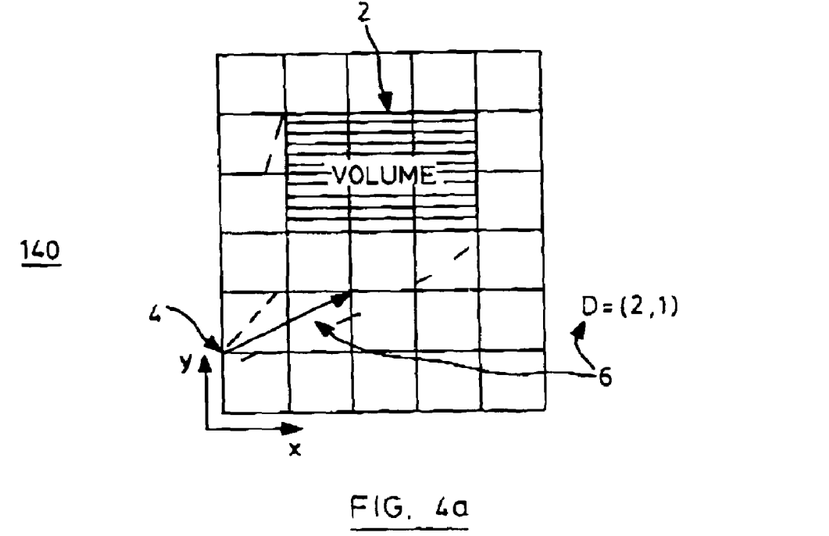
FIGS. 4(a) and (b) is a schematic diagram of a cross-section of a scene to be rendered and its associated viewing frustum.
Figure 4B:
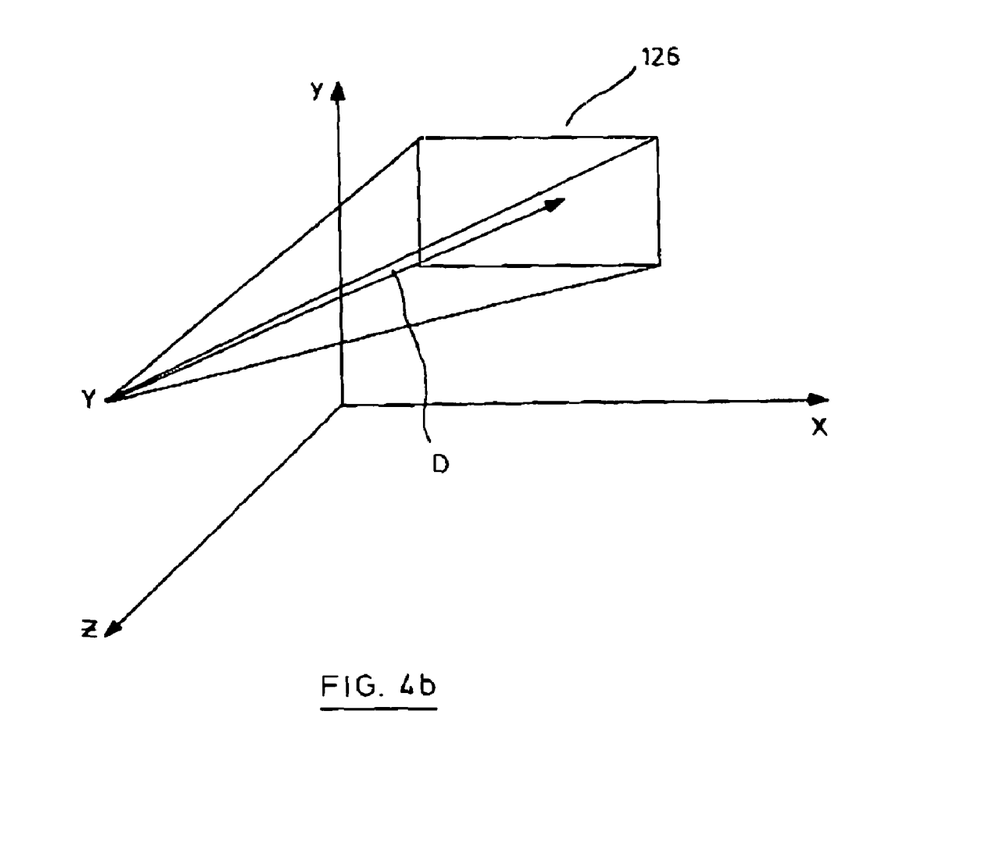

Referring to FIG. 4(a) a cross-section 142 of the volume 126 as shown in FIG. 4(b) and a viewing direction projected onto the x-y plane is shown generally by numeral 140. The viewing direction is indicated by a vector D. As described earlier, shear-warp factorization is achieved by transforming a volume into sheared object space wherein for parallel projection each slice is translated, while for perspective projection each slice is translated and scaled. In both instances in sheared object space the voxel slices can be projected into an image easily. By definition, in sheared object space all viewing rays are parallel to the third coordinate axis or also known as a major axis (the y axis as illustrated in FIG. 4(a)). Thus if there exists a viewing transformation matrix $M_{view}$ that transforms points (represented as column vectors) from object space to image space, then $M_{view}$ may be used to determine the viewing direction D.

The viewing direction D is determined by $$D = M_{view}^{-1} \begin{pmatrix} 0 \\ 0 \\ 1 \\ 0 \end{pmatrix}$$

In the present invention the major axis is selected by using the axis that has the largest component in the viewing direction. For example, the vector D in FIG. 4(a) has the coordinates:

x=2, y=1

Since the x component of D is greater than the y component, the x-axis is selected as the major axis.

Once the major axis is selected, a sample step size is calculated. The volume is resampled with a higher resolution along the major axis. The step size indicates the extent of the resampling. For example, a step size of six implies that the major axis will be sampled with a resolution increased by a factor of six.

Figure 5:
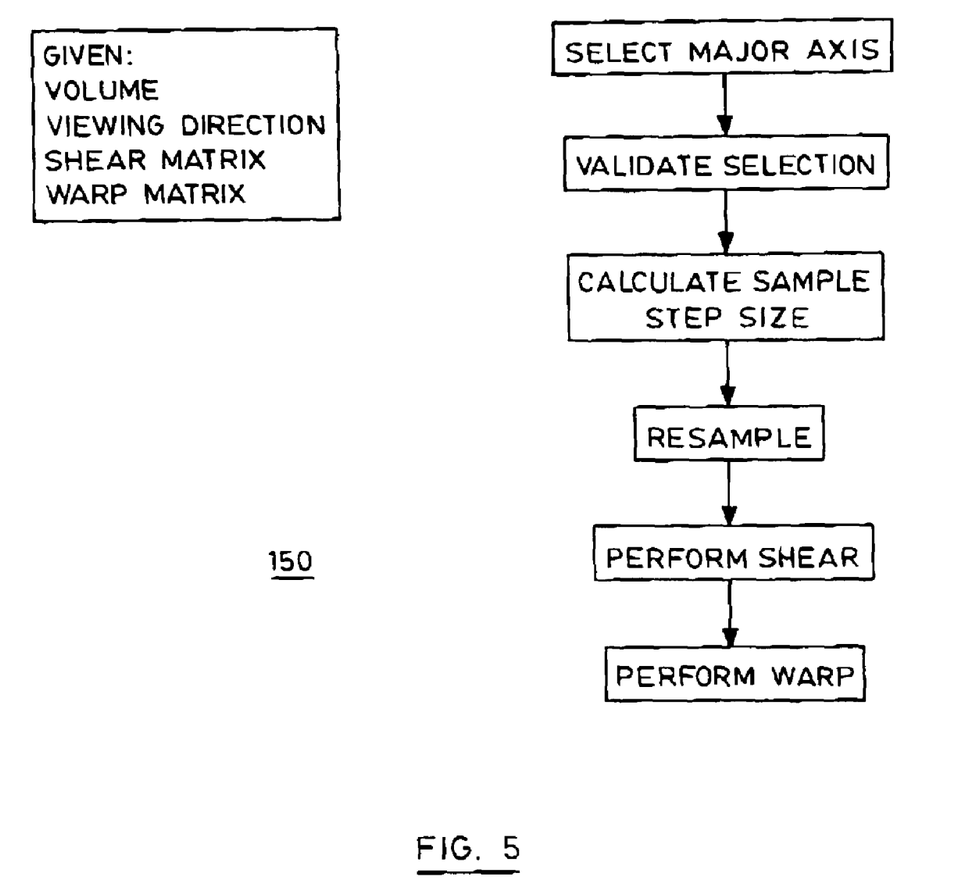
FIG. 5 is a flow chart illustrating the steps involved in the shear warp process according to an embodiment of the invention.

A shear warp transformation is applied to the volume in stack space, that is the stack of sliced 2-D images. The shear warp transformation transforms the image to one that can be displayed. The matrices used in the transformation, $M_{shear}$ and $M_{warp}$, are defined in accordance with the paper "Fast Volume rendering of a Shear Warp Factorization of the Viewing Transformation" by Philippe Lacroute and Marc Levoy, and the major direction is determined as described above. Thus, referring to FIG. 5, a flow chart illustrating the steps involved in the shear warp process according to an embodiment of the invention is shown generally by numeral 150.

Figure 6:
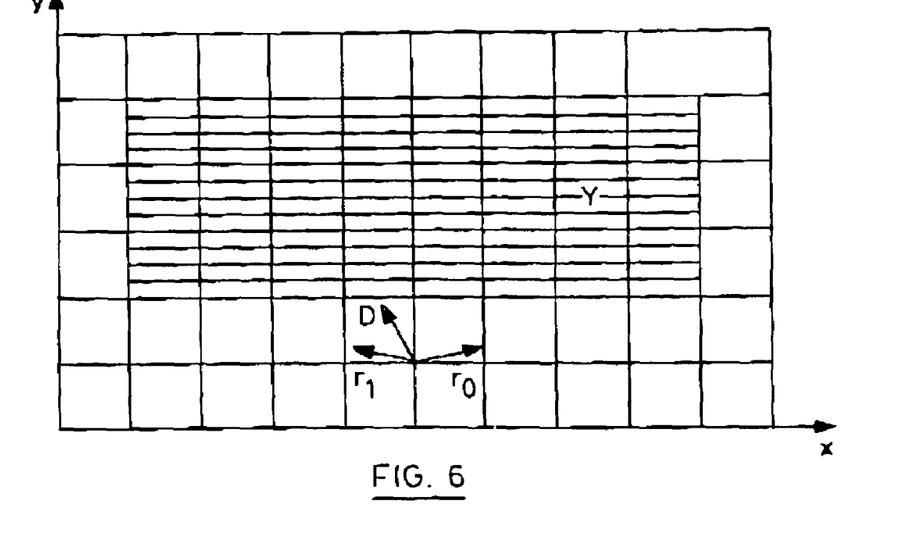
FIG. 6 is another schematic diagram of a cross-section of a scene to be rendered.

In some instances all the viewing rays in the viewing frustum are not guaranteed to have the same major axis and therefore it may not be possible to use only one factorization. Referring to FIG. 6 a 2D example is illustrated in which all the viewing rays do not have the same major axis. Once again D represents the viewing, direction vector, vectors $r_0$ and $r_1$ represent two rays in the viewing frustum other than D, and V represents the volume in stack space to be rendered. In this particular example, D=(-0.2, 1), $r_0$=(1,0.2), and $r_1$=(-1,0.2). Therefore, the largest component of the vector D is in the y direction and the y-axis is selected as the major axis.

However, the situation appears quite different in object space. From Lacroute et. Al. above the general equation for a 2D-shear matrix $M_{shear}$ is given by:

$$M_{shear} = \begin{bmatrix} 1 & -s \\ 0 & 1 \end{bmatrix}$$

where s is the ratio of the component of the vector in the viewing direction that is not along the major axis to the component that is along the major axis. Therefore s=-0.2 and the shear matrix is:

$$M_{shear} = \begin{bmatrix} 1 & 0.2 \\ 0 & 1 \end{bmatrix}$$

Figure 7:
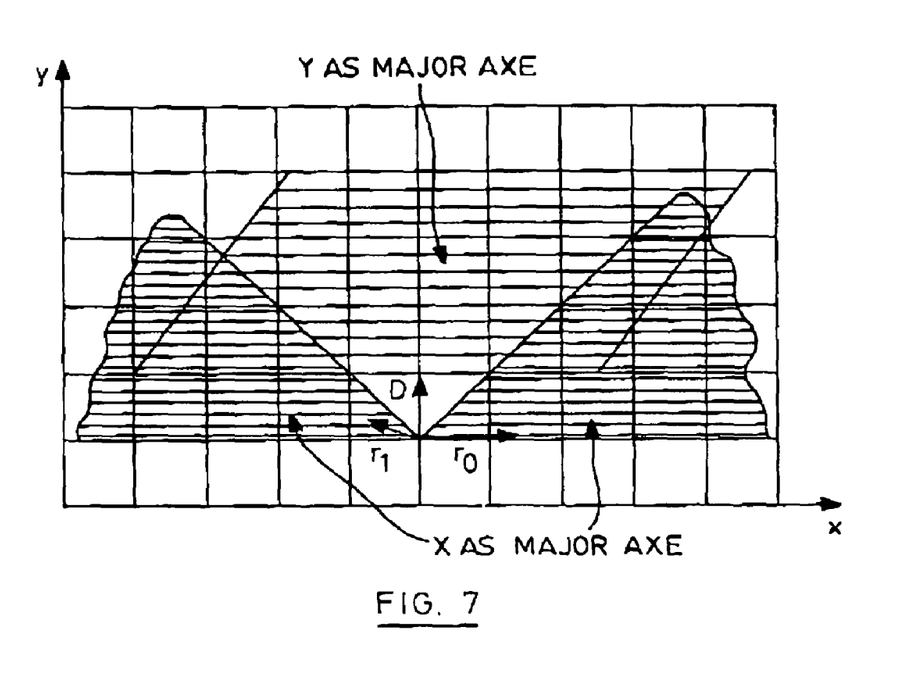
FIG. 7 is schematic diagram of the image in FIG. 6 after shearing.
Figure 8:
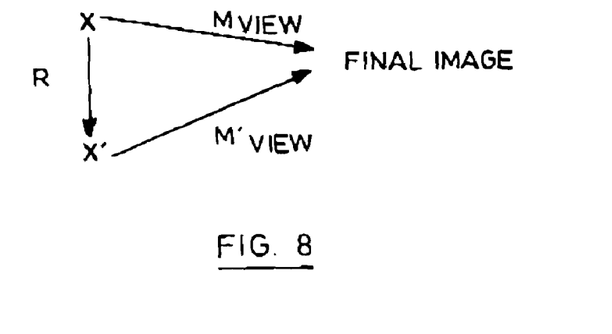
FIG. 8 is a schematic graph illustrating the mapping of two related points to the same results.

The vectors in shear space are:

$D'=M_{shear}D=(0,1)$ $r'_0=M_{shear}r_0=(1.04, 0.2)$ $r'_1=M_{shear}r_1=(-0.96, 0.2)$ The sheared image is shown in FIG. 7. It can be seen that $r'_0$ cannot be calculated using the above factorization because y is not the major axis for this ray.

However, if the volume is resampled with a higher resolution along the major axis it is guaranteed that, under certain conditions, all the rays in the viewing frustum will have the same major axis. Therefore it is desirable to resample the image along the y-axis with resampling step size r. The resampled volume Y' is related to the original volume Y by:

$$Y' = \begin{pmatrix} x \\ ry \\ z \\ t \end{pmatrix} = \begin{pmatrix} 1 & 0 & 0 & 0 \\ 0 & r & 0 & 0 \\ 0 & 0 & 1 & 0 \\ 0 & 0 & 0 & 1 \end{pmatrix} \begin{pmatrix} x \\ y \\ z \\ t \end{pmatrix} = RY$$

As shown schematically in FIG. 7, Y is transformed to the final image O using the matrix $M_{view}$. Therefore it is necessary to find the matrix $M_{view}'$ to transform Y' to the same O. It is known that:

$O=M_{view}'Y'$ (1)

and $O=M_{view}Y=M_{view}R^{-1}RY=M_{view}R^{-1}Y'$ (2)

By comparing equation 1 with equation 2 it can be determined that:

$$M'_{view} = M_{view}R^{-1} =$$

$$\begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} 1 & 0 & 0 & 0 \\ 0 & 1/r & 0 & 0 \\ 0 & 0 & 1 & 0 \\ 0 & 0 & 0 & 1 \end{pmatrix} = \begin{pmatrix} m_{11} & m_{12}/r & m_{13} & m_{14} \\ m_{21} & m_{22}/r & m_{23} & m_{24} \\ m_{31} & m_{32}/r & m_{33} & m_{34} \\ m_{41} & m_{42}/r & m_{43} & m_{44} \end{pmatrix}$$

It is necessary to calculate the viewer position in stack space as:

$$e'_{o,x} = \frac{\left| \begin{pmatrix} 0 & m_{12}/r & m_{13} & m_{14} \\ 0 & m_{23}/r & m_{23} & m_{24} \\ -1 & m_{32}/r & m_{33} & m_{34} \\ 0 & m_{42}/r & m_{43} & m_{44} \end{pmatrix} \right|}{|M'_{view}|} =$$

$$-r \frac{\begin{vmatrix} m_{12}/r & m_{13} & m_{14} \\ m_{22}/r & m_{23} & m_{24} \\ m_{42}/r & m_{43} & m_{44} \end{vmatrix}}{|M_{view}|} = \frac{-r}{r} \frac{\begin{vmatrix} m_1 & m_{13} & m_{14} \\ m_{22} & m_{23} & m_{24} \\ m_{42} & m_{43} & m_{44} \end{vmatrix}}{|M_{view}|} = e_{o,x}$$

since $|M'_{view}|=|M_{view}R^{-1}|=|M_{view}||R^{-1}|$. Also $$e'_{o,y} = \frac{\left|\begin{pmatrix} m_{11} & 0 & m_{13} & m_{14} \\ m_{21} & 0 & m_{23} & m_{24} \\ m_{31} & -1 & m_{33} & m_{34} \\ m_{41} & 0 & m_{43} & m_{44} \end{pmatrix}\right|}{|M'_{view}|} = r\frac{\left|\begin{matrix} m_{11} & m_{13} & m_{14} \\ m_{21} & m_{23} & m_{24} \\ m_{41} & m_{43} & m_{44} \end{matrix}\right|}{|M_{view}|} = re_{o,y}$$

since $\left|\begin{matrix} \alpha a & b & c \\ \alpha d & e & f \\ \alpha g & h & k \end{matrix}\right| = \alpha \left|\begin{matrix} a & b & c \\ d & e & f \\ g & h & k \end{matrix}\right|$.

Following the same rule $e'_{o,z}$ and $e'_{o,w}$ are:

$$e'_{o,z} = \frac{\left|\begin{pmatrix} m_{11} & m_{12}/r & 0 & m_{14} \\ m_{21} & m_{22}/r & 0 & m_{24} \\ m_{31} & m_{32}/r & -1 & m_{34} \\ m_{41} & m_{42}/r & 0 & m_{44} \end{pmatrix}\right|}{|M'_{view}|} = e_{o,z}$$

$$e'_{o,w} = \frac{\left|\begin{pmatrix} m_{11} & m_{12}/r & m_{13} & 0 \\ m_{21} & m_{23}/r & m_{23} & 0 \\ m_{31} & m_{32}/r & m_{33} & -1 \\ m_{41} & m_{42}/r & m_{43} & 0 \end{pmatrix}\right|}{|M'_{view}|} = e_{o,w}$$

If the viewer is located outside the volume, vectors are constructed from the viewer position to each one of the corners of the volume. These vectors represent the boundary of the viewing frustum and all the rays are included in it. If points $p'_i$ for i=0 . . . 6 are the corners of a volume in Y' then the major direction for each vector is defined as:

$$c = \max(|p'_{i,x} - e'_{o,x}|, |p'_{i,y} - e'_{o,y}|, |p'_{i,z} - e'_{o,z}|) = \max(|p_{i,x} - e_{o,x}|, r|p_{i,y} - e_{o,y}|, |p_{i,z} - e_{o,z}|) \quad (3)$$

From equation 3 it can be determined that as long as $$|p_{i,y} - e_{o,y}| \neq 0 \forall i \quad (4)$$

there exists an integer r that, when used as the sample step size, ensures all rays in the viewing frustum have the same major axis. Since all the rays in the frustum have the same major axis, they are all rendered with the same factorization. Therefore, the image displayed does not have the visual defects that may arise if the image is rendered with multiple factorizations and then patched together. The image is also rendered faster than if multiple factorizations are used.

Figure 9:
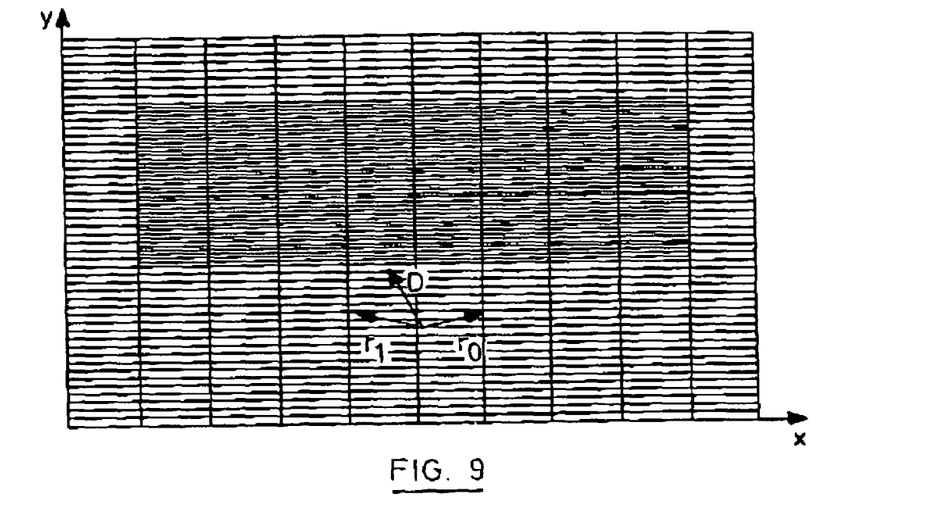
FIG. 9 is a schematic diagram of the cross-section of the scene in FIG. 4(a) after resampling.

Referring once again to the 2D scene in FIG. 6, it is possible to resample the scene along the y-axis. If it is determined that the value for r is 6, then the scene is resampled with a step size of 6 and the results are shown in FIG. 9. The new values for the vectors are: D=(−0.2, 6); $r_0$=(1,1.2); and $r_1$=(−1,1.2). Here s=−0.2/6 and the shear matrix is:

$$M_{shear} = \begin{bmatrix} 1 & \frac{0.2}{6} \\ 0 & 1 \end{bmatrix}$$

The vectors in shear space are:

$$D' = M_{shear} D = (0,6);$$

$$r'_0 = M_{shear} r_0 = (1.004, 1.2);$$

$$r'_1 = M_{shear} r_1 = (-0.996, 1.2).$$

Figure 10:
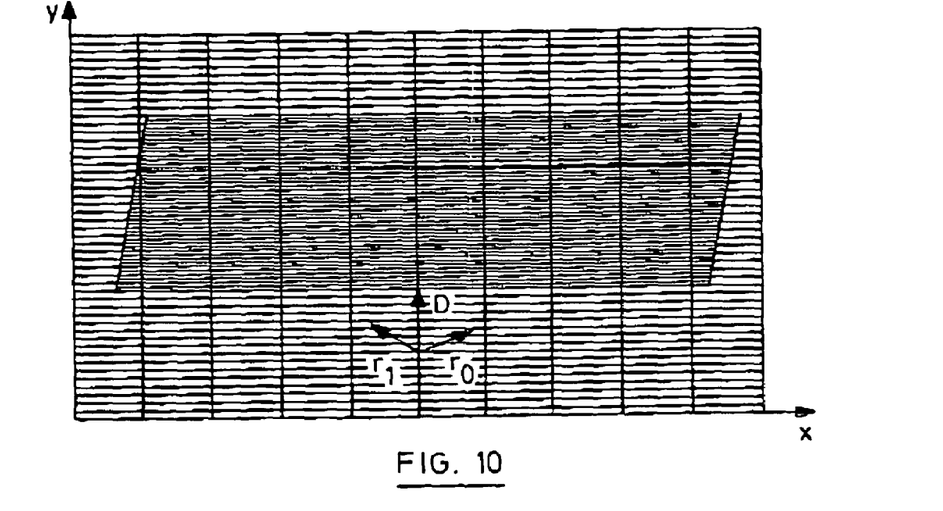
FIG. 10 is a schematic diagram of the cross-section of the scene in FIG. 9 after shearing.

The sheared image is shown in FIG. 10. At this point, it is possible to see that in object space, the y-axis is the major axis for all the vectors and therefore only one factorization will be necessary.

If the position of the viewer is located within the volume, a different procedure is used to determine the value for r. In this case it is necessary to form a ray to each of the voxels in the viewing frustum. If $v'_i$ is a voxel in the viewing frustum then the vector from the observer to this voxel is $v'_i - e'_o$. The major direction is determined by:

$$c = \max(|v'_{i,x} - e'_{o,x}|, |v'_{i,y} - e'_{o,y}|, |v'_{i,z} - e'_{o,z}|) = \max(|v_{i,x} - e_{o,x}|, r|v_{i,y} - e_{o,y}|, |v_{i,z} - e_{o,z}|) \quad (5)$$

In this situation, however, there is no guarantee that there can be a value for r such that $$|v_{i,y} - e_{o,y}| \neq 0 \forall i \quad (6)$$

In fact, if the viewing angle is wide enough, it may be required to trace rays parallel to all three axes. This results in at least one ray with a zero co-ordinate for each axis and therefore it is not possible to use the same factorization. Therefore, the limit that this imposes is that the viewing angle must be less than a 90° solid angle.

It is important to note that although the case for resampling along the y-axis has been explained, it can be shown in a very similar manner for all the other axes.

In the case in which the observer is outside the stack, one axis that satisfies equation (4) can always be found.

In a second embodiment, it is possible to improve the performance of the algorithm. The sample step size r is calculated in the same manner as it was in the previous embodiment. Although, resampling the image improves the performance of the algorithm there is still an overhead associated with it. Therefore, if the amount of resampling to be done is minimized a further performance enhancement can be realized. As it can be seen in FIG. 7, some rays have the y-axis as the major axis while others have the x-axis as the major axis. Those rays that already have the y-axis as the major axis are not resampled. Therefore, if the resampling occurs only in the region that originally has the x-axis as the major axis, then not as many resources and not as much time will be used to perform the shear.

Figure 11:
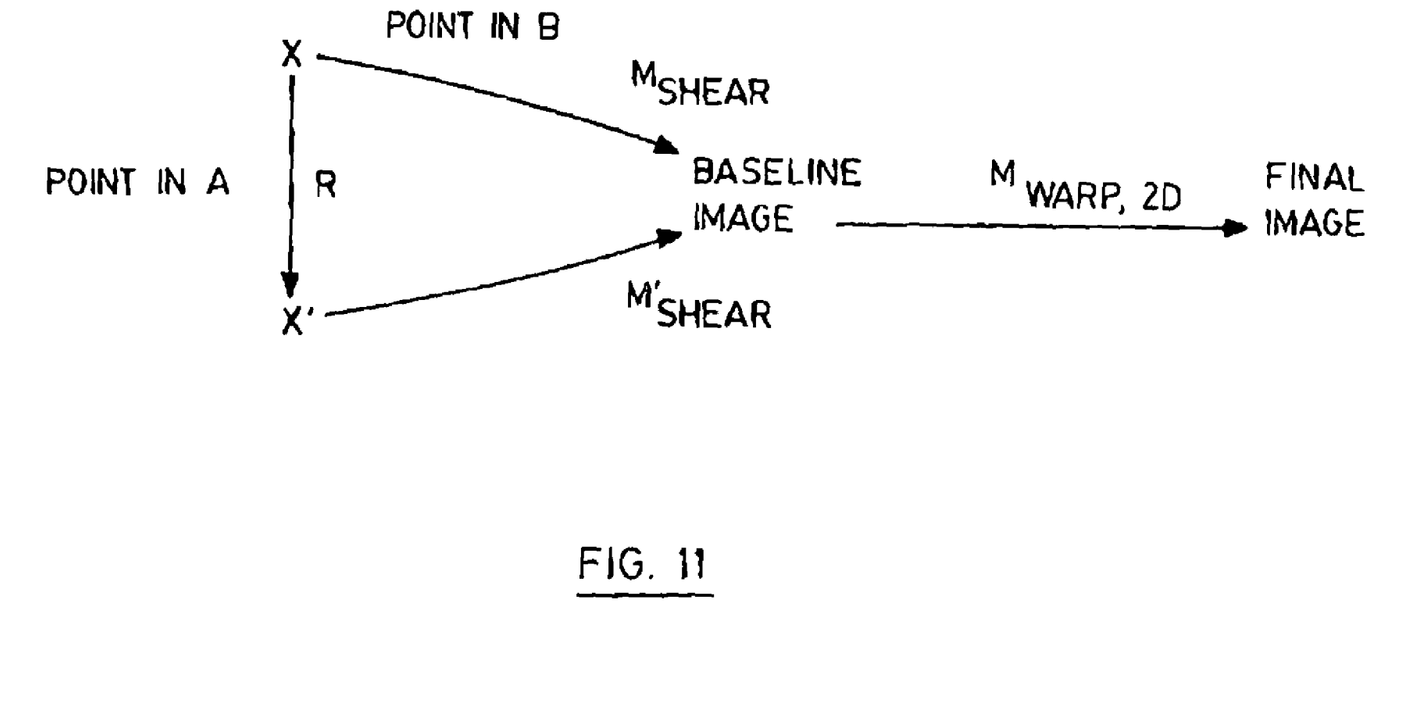
FIG. 11 is a schematic graph illustrating the use of different shear matrices and the same warp matrix for factorization.

An important aspect of this method is the fact that the addition of a resampling step does not change the warp matrix. As is illustrated schematically in FIG. 11, although two different shear matrices are used to transform the volume to a baseline image, the same warp matrix can be used to transform the baseline image to the final image.

If $M_{view}$ and $M'_{view}$ are two matrices with different resampling steps and the resampling occurs in the x direction:

$$M_{view} = M_{warp}M_{shear} = \begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix} \begin{pmatrix} 1 & 0 & 0 & 0 \\ -sy & 1 & 0 & 0 \\ -sz & 0 & 1 & 0 \\ -p & 0 & 0 & 1 \end{pmatrix} \text{ and}$$

$$M'_{view} = M_{warp}M_{shear}R^{-1} = \begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix} \begin{pmatrix} 1 & 0 & 0 & 0 \\ -sy & 1 & 0 & 0 \\ -sz & 0 & 1 & 0 \\ -p & 0 & 0 & 1 \end{pmatrix} \begin{pmatrix} 1/r & 0 & 0 & 0 \\ 0 & 1 & 0 & 0 \\ 0 & 0 & 1 & 0 \\ 0 & 0 & 0 & 1 \end{pmatrix}$$

$$= \begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix} \begin{pmatrix} 1/r & 0 & 0 & 0 \\ -sy/r & 1 & 0 & 0 \\ -sz/r & 0 & 1 & 0 \\ -p/r & 0 & 0 & 1 \end{pmatrix} = \begin{pmatrix} w_{11}/r & w_{12}/r & w_{13}/r & w_{14}/r \\ w_{21} & w_{22} & w_{23} & w_{24} \\ w_{31} & w_{32} & w_{33} & w_{34} \\ w_{41} & w_{42} & w_{43} & w_{44} \end{pmatrix} \begin{pmatrix} 1 & 0 & 0 & 0 \\ -sy/r & 1 & 0 & 0 \\ -sz/r & 0 & 1 & 0 \\ -p/r & 0 & 0 & 1 \end{pmatrix}$$

$$= M'_{wrap}M'_{shear}$$

The warp matrix is really a 2-D matrix since it is applied to the baseline image in shear space in which the slices have been composed. The first row of this matrix can be compressed because the x-axis is used in the factorization:

$$M_{warp,2D} = \begin{pmatrix} w_{21} & w_{22} & w_{23} & w_{24} \\ w_{31} & w_{32} & w_{33} & w_{34} \\ w_{41} & w_{42} & w_{43} & w_{44} \end{pmatrix}$$

and $M'_{warp,2D} = M_{warp,2D}$. This property allows the use of different sample step sizes in shear space along the major axis.

Since the warp matrix to be used is the same regardless of the value of r, and all the major axes are the same, there is still only one factorization and the image will not have to be patched together. Also, as previously mentioned, the speed of the algorithm is a further improvement to the previous embodiment.

As in the previous embodiment, it is important to note that although the case for resampling along the x-axis has been explained, it can be shown in a very similar manner for all the other axes.

Also, the examples given for all embodiments have related to 2D scenes for simplicity only. In reality, the scenes that are rendered are 3D and the methods described herein are simply extended to the 3D application.

Although the invention has been described with reference to certain specific embodiments, various modifications thereof will be apparent to those skilled in the art without departing from the spirit and scope of the invention as outlined in the claims appended hereto.

The invention claimed is:

1. A method for generating a 2-D image projection directly from a 3-D volume data, the method comprising the steps of:
    a) determining a viewing direction vector in a viewing frustum, the viewing frustum containing a plurality of viewing vectors;
    b) determining a major axis of the viewing direction vector;
    c) re-sampling a selected set of the viewing vectors in the volume data with a refined grid according to a selected image parameter, the re-sampling in a direction of said major axis, the image parameter being selected so as to provide each vector of the selected set of viewing vectors with the same major axis as the direction vector;
    d) applying a shear factorization to the re-sampled data according to the selected image parameter, and
    e) applying a warp operator for rendering the factorized data to produce said 2-D image projection.

2. The method according to claim 1 further comprising the step of determining said viewing frustum by specifying positional data of a viewing point and a central point, said central point to be substantially centered in said 2-D projection.

3. The method according to claim 2, wherein said positional data of said viewing point further includes direction of orientation data of said viewing point in said volume data.

4. The method according to claim 2, wherein said viewing frustum is a truncated pyramidal geometrical structure.

5. The method according to claim 4 further comprising the step of determining boundaries of said viewing frustum by constructing boundary vectors, each of the boundary vectors including said viewing point and extending to each respective corner of said volume data, wherein said viewing point is positioned external to the positions contained by said volume data.

6. The method according to claim 5 further comprising the step of employing geometrical information obtained from said boundary vectors for determining the image parameter used to select a resolution of said refined grid, the image parameter being a step size.

7. The method according to claim 1 further comprising the step of using the major component of said viewing direction vector for determining said major axis.

8. The method according to claim 7 further comprising the step of selecting the image parameter for determining a resolution of said refined grid, the image parameter being a step size.

9. The method according to claim 8, wherein said step size is used for providing a plurality of viewing vectors in said viewing frustum having the same said major axis in an object viewing space as said viewing direction vector.

10. The method according to claim 9, wherein said viewing direction vector contains a viewing point and a central point, said central point is substantially centered in said 2-D image projection.

11. The method according to claim 9, wherein a plurality of viewing vectors in said viewing frustum are rendered with the same factorization matrix.

12. The method according to claim 9 further comprising the step of using one copy of said volume data for applying said shear factorization.

13. The method according to claim 12 further comprising the step of accessing said volume data in a pre-defined storage order.

14. The method according to claim 13, wherein said volume data is stored in a memory in a stack of 2-D image slices.

15. The method according to claim 14 further comprising the step of accessing said memory once for every selected one of the image slices in said stack.

16. The method according to claim 2 further comprising the step of constructing the set of separate viewing vectors containing said viewing point and each of the separate viewing vectors extending to a respective one of a plurality of voxels contained in said viewing frustum, wherein a position of said viewing point is located within said volume data.

17. The method according to claim 16 further comprising the step of selecting the image parameter for determining a resolution of said refined grid, the image parameter being a step size, wherein a viewing angle contained by said viewing frustum and said viewing direction vector is less than 90 degrees.

18. The method according to claim 1 further comprising the step of restricting the re-sampling step to selected ones of the set of the plurality of viewing vectors in said viewing frustum, said selected ones having a preliminary major axis different from said major axis of said viewing direction vector.

19. A method according to claims 15, wherein the rendering of said factorized data produces a 3-D image.

20. A system for generating in substantially real-time fashion a 2-D image projection directly from a 3-D volume data in response to input from a user, the system comprising:
 a) a memory for storing the volume data;
 b) a processor for factorizing and rendering an image data set selected from said volume data, the image data set including a viewing frustum having a viewing direction vector with a selected major axis and a plurality of viewing vectors; and
 c) a user interface for providing said processor with an image parameter, said image parameter to be used in generating the image projection;
 d) a display for displaying said image projection provided by said processor; and
 e) a refined grid used by said processor for re-sampling a selected set of the viewing vectors in said image data set;
 wherein said image parameter facilitates determination of a resolution of said refined grids to provide each vector of the selected set of viewing vectors with the same major axis of the direction vector.

21. The system according to claim 20, wherein said image parameter includes a viewing point and a central point, said central point being substantially centered in said 2-D image projection.

22. The system according to claim 21, wherein said viewing point and said central point are used for determining a viewing direction for said 2-D image projection.

23. The system according to claim 22, wherein the major component of said viewing direction vector is used for determining a major axis in a sheared object space, said refined grid is applied along said major axis.

24. The system according to claim 20, wherein said volume data is stored in said memory as a stack of 2-D image slices.

25. The system according to claim 24, wherein said processor accesses said memory once for every selected one of said 2-D image slices.

26. The system according to claim 25, wherein said processor accesses said memory in a predefined storage order.

27. The system according to claim 20, wherein said image parameter is used for determining a resolution step size of said refined grid.

28. The system according to claim 24, wherein said stack of 2-D image slices is obtained from an imaging system selected from the group comprising CT, MRI, and Ultrasound.

29. The system according to claim 26, wherein the processing of said image dataset produces a 3-D image.

30. A computer program product for generating a 2-D image projection directly from a 3-D volume data, the product comprising:
 a) a computer readable medium for providing instructions for a processor;
 b) a selection module stored on the computer readable medium for determining a viewing frustum having a viewing direction vector with a selected major axis, the viewing frustum containing a plurality of viewing vectors;
 c) a user interface module coupled to the selection module for providing an image parameter;
 d) a re-sampling module coupled to the user interface module for re-sampling a selected set of the viewing vectors in the volume data with a refined grid according to the selected image parameter;
 e) a generator module for applying a shear factorization and warp operator to the re-sampled set of viewing rays according to the selected image parameter to produce the image projection displayable on a display;
 wherein the image parameter is selected so as to provide each vector of the selected set of viewing vectors with the same major axis of the direction vector.

31. The product according to claim 30, wherein selection of the image parameter provides a step size used to define a resolution of the refined grid.

32. The product according to claim 31, wherein the step size is used to modify the shear factorization.

33. The product according to claim 31, wherein the boundaries of the viewing frustum is determined by constructing boundary vectors, each of the boundary vectors including a viewing point and extending to each respective corner of the volume data, wherein the viewing point is positioned external to the positions contained by the volume data.

34. The product according to claim 31, wherein the set of viewing vectors contains a viewing point and each of the viewing vectors of the set extends to a respective one of a plurality of voxels contained in the viewing frustum, the viewing point being located within the volume data.

35. The product according to claim 34, wherein a viewing angle contained by the viewing frustum and the viewing direction vector is less than 90 degrees.

36. The product according to claim 34, wherein the re-sampling is restricted to selected ones of the set of viewing vectors in the viewing frustum, the selected ones having a preliminary major axis different from the major axis of the viewing direction vector.

37. The product according to claim 36, wherein the viewing frustum is determined by specifying positional data of the viewing point and a central point, the central point being substantially centered in the 2-D projection.

38. The product according to claim 32, wherein the warp operator is independent of the step size selected.

39. The product according to claim 36, wherein processing of the selected set of the viewing rays produces a 3-D image displayable on the display.

* * * * *